Aug. 29, 1950   R. WILLIAMS   2,520,296
ELECTRIC STILL CAMERA
Filed Nov. 22, 1946   2 Sheets-Sheet 1
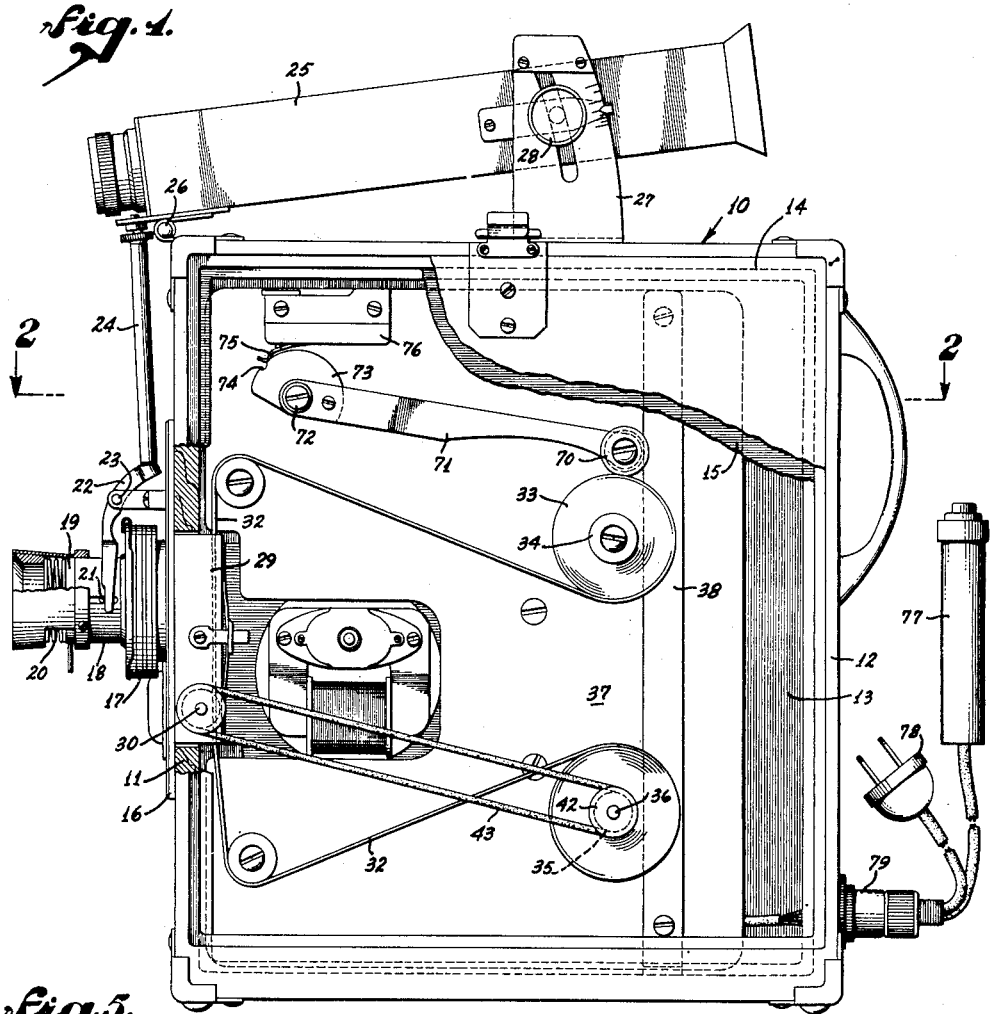
Fig. 1.
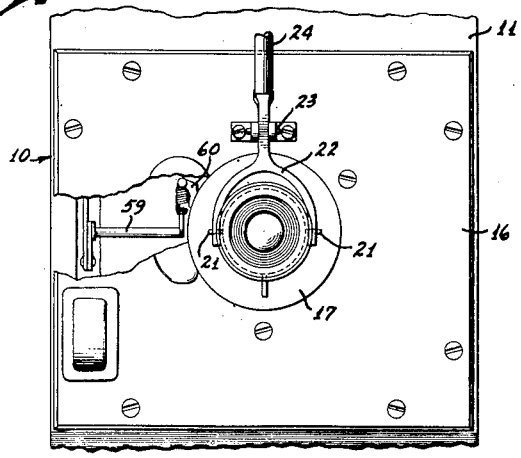
Fig. 5.
Fig. 6.
INVENTOR:
RODGER WILLIAMS.
BY Hudson, Maloby
and Bichler
ATTORNEYS.

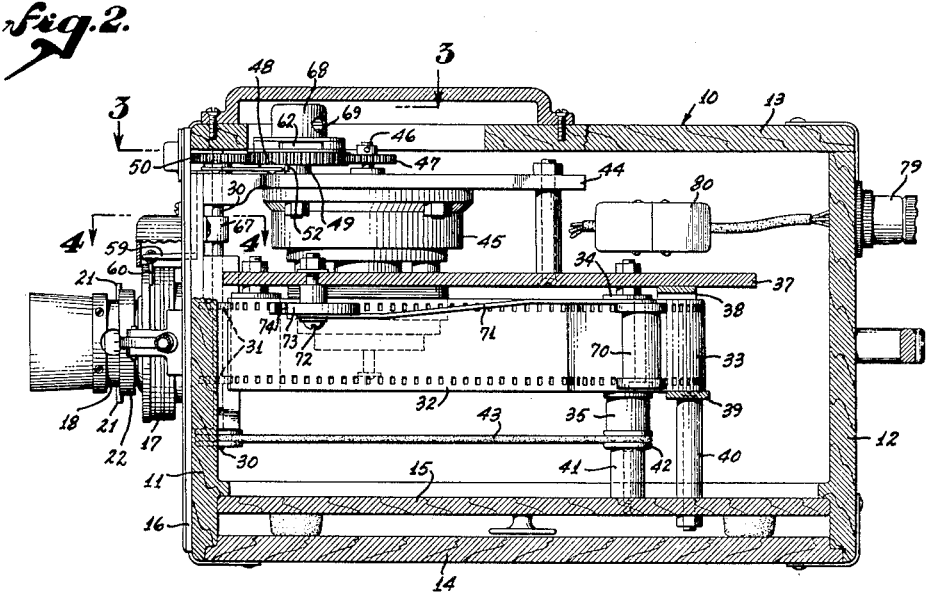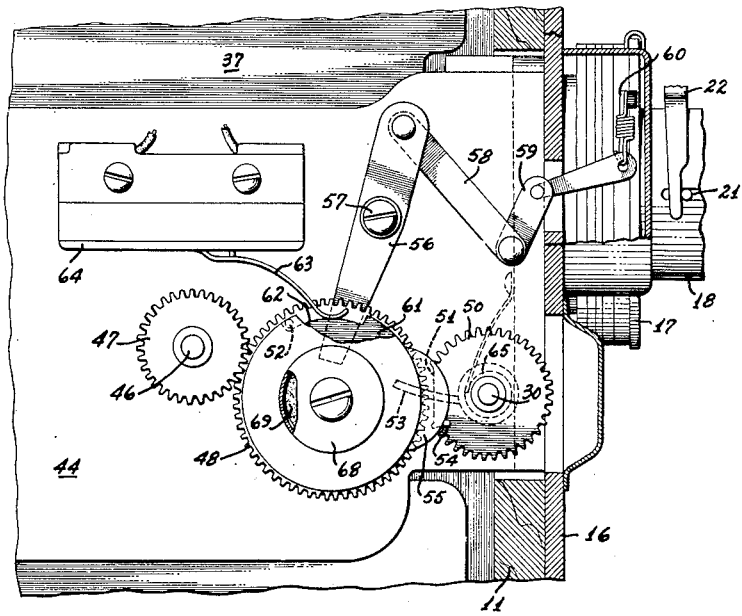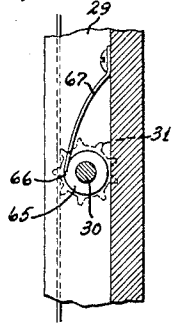

Patented Aug. 29, 1950

2,520,296

UNITED STATES PATENT OFFICE 2,520,296

ELECTRIC STILL CAMERA

Rodger Williams, Los Angeles, Calif.

Application November 22, 1946, Serial No. 711,647

1 Claim. (Cl. 95—31)

This invention relates to photography and more especially to improvements in electric still cameras.

An object of the invention is to provide a simple, practical and efficient camera of the character described.

Another object of the invention is to provide an improved electrically actuated and controlled camera for taking still pictures.

A further object of the invention is to provide an electrically actuated camera for taking a plurality of still pictures on a continuous film wherein after each exposure the camera is automatically reset for a succeeding exposure.

An additional object is to provide an improved and simplified mechanism for taking a plurality of still pictures on a continuous film, a mechanism adapted to take a series of still pictures in rapid succession when desired.

Another object of the invention is to provide in a camera of the character described novel means for simultaneously adjusting a finder and a camera lens for proper focus of the lens.

Other objects and advantages will appear and be brought out more fully in the following specification considered with reference to the accompanying drawings throughout which like parts are designated by like numerals.

In the drawings:

Figure 1 is a side elevation view partly in section of an embodiment of my invention.

Figure 2 is a sectional view taken along the line 2—2 of Figure 1.

Figure 3 is a sectional view taken along the line 3—3 of Figure 2.

Figure 4 is a fragmentary view in section taken along the line 4—4 of Figure 2.

Figure 5 is a partial front elevation view of the camera.

Figure 6 is a diagrammatical view showing the electrical circuit of the camera.

Referring more particularly to the drawings I show an electric still camera having a cabinet 10 which may be of any suitable material but shown as being made of wood, the cabinet having a front wall 11, a rear wall 12, a fixed side wall 13, a removable side wall 14 and a wall 15 which is removable when side wall 14 is removed.

Front wall 11 has a lens opening and a plate 16 is suitably secured to the front wall and provides a mounting for a lens and shutter housing 17 having a tubular member 18 in which a lens tube 19 is slidably mounted. A coil spring 20 is suitably mounted in tubular member 18 to urge lens tube 19 inwardly. A pair of pins 21 extend radially from lens tube 19 through slots in tubular member 18 and are adapted to be engaged by a yoke lever or bell crank 22 which is suitably pivoted at 23. A push rod 24 engages the upper end of bell crank 22 and is suitably secured to the forward end of a finder 25 which is pivotally mounted at 26 on the top of cabinet 10. A bracket 27 is secured on the top of the cabinet and is provided with a slot through which extends a clamp screw 28 which is secured to finder 25. By this construction the rear end of the finder can be raised or lowered and the rocking of the finder on pivot 26 will cause lens tube 19 to be shifted outwardly or inwardly, such that the focus of the lens is changed to correspond with the object being photographed, as placed by the finder 25. The finder may be provided with a pointer registered with a scale on bracket 27 to indicate distance, if desired.

An aperture plate 29 is secured to plate 16 and provides bearing for a shaft 30 which carries a pair of film sprockets 31 which engage and move a film 32 across the aperture plate, the film having a roll portion 33 placed on a spool 34, the exposed film being wound on a spool 35 having a shaft 36 bearing mounted on a wall member 37 on which spool 34 is also mounted.

A guide strip 38 for the film is suitably secured to wall 37 and a guide strip 39 for the opposite side of the film is mounted by a plurality of posts 40 on removable wall 15. A guide post 41 secured to wall 15 is positioned opposite spool 35 and butts against a pulley 42 on the spool by which the spool is driven from a belt 43 from a pulley on shaft 30. A frame 44 is suitably secured to wall 37 and supports the film drive mechanism which comprises a motor 45 having a shaft 46 on which is secured a gear 47. A gear 48 is mounted on a non-rotatable shaft 49 secured to frame member 44, gear 48 being driven by motor shaft gear 47.

A gear 50 is mounted on film sprocket shaft 30 and has a cut-out portion 51 which permits gear 48 to turn a partial turn without turning gear 50 until started in a manner to be presently explained. A pin 52 extends laterally from gear 48 and is adapted to engage an arm 53 extending substantially radially from gear 50, whereby to start gear 50 turning and to engage the teeth thereof with the teeth of gear 48. A pin 54 extends laterally from gear 50 and is engaged by a sector plate 55 secured to gear 48, the plate serving to position gear 50 so that cut-out portion 51 is opposite gear 48 in order that gear 50 will not turn until pin 52 engages arm 53.

Pin 52 is adapted to engage a lever 56 pivoted at 57 on frame member plate 44 and is connected by a link 58 to a bell crank 59 which, in turn, is connected by spring link or the like to a shutter actuating lever 60 forming a part of the lens and shutter housing 17. A cam disc 61 is secured to gear 48 and has a cam groove 62 in which is engageable a switch arm 63 of a running switch 64, the action being such that switch 64 is in open or disconnected position when arm 63 engages in groove 62, the switch being in closed position during the remainder of the rotation of gear 48 and disc 61.

A stop collar 65 is secured on sprocket shaft 30 and has an abutment portion 66 which is engageable with a flexible stop member 67, by which means sprocket shaft 30 is prevented from turning backwardly by any tension occurring in the film 32 from the portion thereof above the aperture plate 29. A housing 68 is secured on fixed shaft 49 and mounts a friction disc 69 which engages disc 61 and provides quick stopping means for the drive mechanism upon the opening of the electrical circuit to motor 45.

A roller 70 is mounted on an arm 71 pivoted at 72 to wall member 37 and rests on the film roll 33. Arm 71 has a disc 73 secured thereto, the disc having a cam groove 74 in which engages a switch arm 75 of an auxiliary switch 76. A push button switch 77 is connected by flexible cord wiring which includes a plug 78 for connection to a suitable source of power, the wiring including a plug and receptacle unit 79 outside of the cabinet 11 and a plug and receptacle unit 80 within the cabinet, it being clear that the drive mechanism is all mounted on wall member 37 and can be readily removed from the cabinet by separating plug unit 80.

The operation of the invention should be apparent from the foregoing description. Switch 76 is normally closed when a supply of film, such as roll 33, is positioned on spool 34. Upon push button switch 77 being closed, power is supplied to motor 45 and the drive therefrom rotates gear 48 clockwise, as seen in Figure 3. The initial turning of this gear approximately 90° causes pin 52 to actuate shutter lever 56 to operate the shutter lever to expose a frame of the then stationary film 32, and pin 52, upon engaging arm 53, starts rotation of gear 50 which continues for one rotation thereof by gear 48. During this initial movement of gear 48, switch arm 63 is raised by cam disc 61, closing switch 64 which provides a closed circuit for the motor if push button switch 77 is opened during this cycle. Upon the completion of the cycle, when gear 48 again reaches the position shown in Figure 3, switch arm 63 is actuated to open position and the motor is stopped. If, however, the push button switch 77 is held in closed position, the cycle will be repeated and successive actuation of the shutter will occur to expose successive frames of the film 32.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claim so as to embrace any and all equivalent devices and systems.

Having thus described my invention, what I claim and desire to secure by Letters Patent is:

An electric still camera having a continuous film comprising, in combination, a lens having a shutter, a gear train drive having a driving gear and a driven gear for moving said film to present successive frames thereof opposite said shutter, means actuated by said gear train to operate said shutter, said driven gear having a cut-out portion adapted to retain said film stationary during operation of said shutter, a motor for said drive, a starting switch for said motor and a running switch for said motor adapted to operate said motor throughout a cycle of operation of said camera, said driving gear having a cam member for actuating said running switch, said driven gear having a member actuatable by said means to effect tooth engagement of said gears and means to align said driven gear cut-out portion with said driving gear, said last means including a pin on said driven gear and a sector plate on said driving gear engageable with said pin.

RODGER WILLIAMS.

REFERENCES CITED

The following references are of record in the file of this patent:

UNITED STATES PATENTS

| Number | Name | Date |
| --- | --- | --- |
| 1,946,323 | Kucharski | Feb. 6, 1934 |
| 1,957,889 | Hopkins et al. | May 8, 1934 |
| 1,963,095 | Petit et al. | June 19, 1934 |
| 2,125,388 | Monroe | Aug. 2, 1938 |
| 2,422,354 | Holbrook | June 17, 1947 |